Patented Nov. 11, 1952

2,617,797

UNITED STATES PATENT OFFICE 2,617,797

AZO DYESTUFFS

Walter Anderau, Basel, Switzerland, assignor to Ciba Limited, Basel, Switzerland, a Swiss firm No Drawing. Application May 8, 1950, Serial No. 160,823. In Switzerland May 20, 1949

9 Claims. (Cl. 260—153)

This invention relates to direct dyeing azo dyestuffs and to the manufacture thereof.

The present invention is based on the observation that valuable direct dyeing azo dyestuffs are obtained when an aminomonoazo dyestuff which is obtained by coupling a diazotized 3-aminopyrene sulfonic acid with a primary amine of the benzene series coupling in p-position to the amino group, is linked by means of a compound with replaceable halogen atoms of the type of phosgene, cyanuric chloride and dichloroquinazoline, with an aminoazo dyestuff which corresponds to the general formula

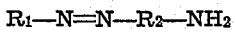

in which $R_1$ indicates an aromatic radical and $R_2$ a benzene nucleus in which the —$NH_2$ group is in p-position to the azo linkage.

In the said process, as above stated, aminomonoazo dyestuffs from diazotized 3-aminopyrene sulfonic acids and primary amines of the benzene series coupling in p-position to the amino group serve as starting materials. As 3-aminopyrene sulfonic acids for the manufacture of these starting materials there are advantageously concerned disulfonic acids of this compound, for example the 3-aminopyrene disulfonic acid, which is obtained by sulfonation with concentrated, for example 100 per cent. sulfuric acid, of 3-aminopyrene-4-sulfonic acid of the formula

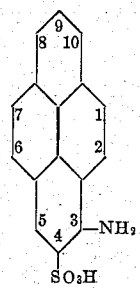

(which is itself produced by baking the acid sulfate of 3-aminopyrene). However a 3-aminopyrene sulfonic acid, which is obtained directly from 3-aminopyrene by sulfonation with concentrated sulfuric acid, yields especially valuable dyestuffs. This sulfonation product is not a homogeneous substance. By the action of concentrated, for example 100 per cent. sulfuric acid on 3-aminopyrene, according to experience hitherto, a sulfonic acid group first enters the 8- or 10-position of the pyrene nucleus; the sulfonic acid group thus being present in the six membered ring which is condensed with two six membered rings of the pyrene nucleus and which does not contain the amino group, and being bound to a carbon atom of this six membered ring, which carbon atom is vicinal to a carbon atom directly bound to three carbon atoms. From the resulting 3-aminopyrene monosulfonic acids the corresponding disulfonic acids are very easily produced by further action of sulfuric acid, the second sulfonic acid group entering the 5-position. According to the working conditions the entry of the second sulfonic acid group may be more or less complete, so that some monosulfonic acid may still be present. The product obtainable by sulfonation of 3-aminopyrene accordingly very probably constitutes a mixture of the two disulfonic acids of the formulae

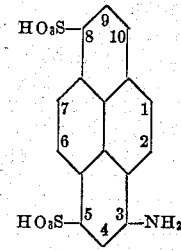

and

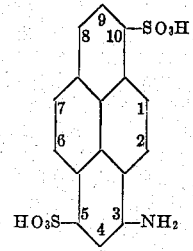

which may also contain some 3-aminopyrene-8- and/or -10-monosulfonic acid.

As examples of the primary amines of the benzene series to be coupled with the diazotized 3-aminopyrene sulfonic acids the following compounds may be mentioned: aminobenzene, 3-methyl - 1 - aminobenzene, 3 - methoxy - 1-aminobenzene, 1 - amino - 2 - methoxy - 5-methylbenzene, 1 - amino - 2:5 - dimethoxybenzene, 1 - amino - 2 ethoxy - 5 - methoxybenzene and so on.

The diazotization of the 3-aminopyrene sulfonic acids can take place according to customary methods known per se. If as starting materials a sulfonic acid is selected which is prepared from 3-aminopyrene by sulfonation with concentrated sulfuric acid, it is suitable to employ directly for the diazotization the paste containing water obtainable by dilution of the sulfonation mixture and filtering off the product thereby separated. As a rule this paste already contains so much sulfuric acid that a further addition of acid for the diazotization is not necessary.

The coupling of the diazotized 3-aminopyrene sulfonic acids with the amines of the benzene series is suitably carried out in an acid medium. In general it is advantageous to couple the diazo compound with the coupling component in strong acid, for example mineral acid medium and then to neutralise the mineral acid by suitable additions as for example sodium acetate, sodium formate or sodium carbonate, so that the coupling mixture finally reacts weakly acid to neutral. The amino-monoazo dyestuffs thus obtainable constitute valuable intermediate products; they are with advantage salted out of the coupling mixture, filtered off and employed further as moist pastes.

The aminoazo dyestuffs corresponding to the formula $R_1-N=N-R_2-NH_2$ to be used as starting materials in the process for producing the dyestuffs of this invention, can be obtained by coupling a diazo compound for example of the benzene or naphthalene series, with a primary amine of the benzene series coupling in p-position to the amino group.

As diazo compounds for the manufacture of such aminomonoazo dyestuffs there are concerned for example the diazo compounds of 1-amino-8-hydroxynaphthalene-3:6-disulfonic acid or of 1-amino-8-hydroxynaphthalene-4:8-disulfonic acid.

In this case also the other amines of the benzene series above mentioned can be used as coupling components.

However aminoazo dyestuffs obtainable according to other methods can also be used for the condensation, as for example 4-amino-4'-hydroxy-1:1'-azobenzene-3'-carboxylic acid.

Especially valuable azo dyestuffs can be obtained when there are employed as primary amines which are condensed with the aminomonoazo dyestuffs from diazotized 3-aminopyrene sulfonic acids and middle components, aminomonoazo dyestuffs of the same type, that is to say when two molecular proportions of the same or one molecular proportion each of two different aminomonoazo dyestuffs from diazotized 3-aminopyrene sulfonic acids and primary amines of the benzene series coupling in p-position to the amino group, are reacted with phosgene, cyanuric chloride or dichloroquinazoline.

When the reaction takes place using phosgene it can be carried out according to methods known per se for example by passing phosgene into a solution of the aminoazo dyestuff or of the two aminoazo dyestuffs in weak alkaline medium at slightly elevated temperature until compounds containing $-NH_2$ groups can no longer be detected. The condensation with phosgene is suitable for the manufacture of asymmetrical products by treating with phosgene two different aminoazo dyestuffs, but it can also be used with advantage for the manufacture of symmetrical disazo dyestuffs by condensing with phosgene to the urea derivative two molecular proportions of an aminomonoazo dyestuff from a diazotized 3-aminopyrene sulfonic acid and a primary amine of the benzene series coupling in p-position to the amino group.

The condensation with 2:4-dichloroquinazoline or cyanuric chloride can also take place according to methods known per se. Since in these compounds as is known the reaction on the first halogen atom takes place much more easily than that on the second, in this case also the manufacture of uniform asymmetrical dicondensation products takes place with good result. Among others in this case also the symmetrical condensation products of two molecular proportions of an aminomonoazo dyestuff of the specified constitution with one molecular proportion of cyanuric chloride, have proved to be of value. In the condensation products obtainable from cyanuric chloride the remaining third chlorine atom can either remain unchanged, be converted into the hydroxyl group or the $-NH_2$ group, or be replaced by the radical of a primary or secondary amine, advantageously a simply constituted amine such as aminobenzene 1-amino-2-methyl-benzene, 1-aminobenzene-3-sulfonic acid, monoethanolamine, dimethylamine.

The azo dyestuffs obtainable according to the present process are new and correspond to the general formula $$R_1-N=N-R_2-NH-X-HN-R_4-N=N-R_3$$

in which $R_1$ indicates an aromatic radical, $R_2$ a benzene nucleus in which the $-NH$ group is in p-position to the corresponding azo linkage, $R_3$ a pyrene radical containing one or more sulfonic acid groups and attached in 3-position to the corresponding azo linkage, $R_4-NH$ a radical of an amine of the benzene series attached, in p-position to the $-NH$ group, to the corresponding azo linkage and X one of the atom groupings

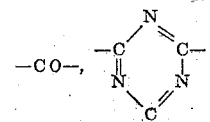

and

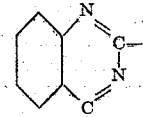

The radical of the 3-aminopyrene sulfonic acid exerts a surprisingly favorable effect upon the affinity of the dyestuffs for cellulosic fibers. The new dyestuffs, which in addition can be used for the dyeing of other materials, for example of animal origin such as wool, are therefore suitable above all for the dyeing and printing of cellulosic fibers such as linen, cotton and artificial silk or staple fiber from regenerated cellulose.

If the dyestuffs contain metal complex-forming groups, for example o-hydroxycarboxy groupings, such as are present in salicylic acid radicals, they can be treated with agents providing metal, for example chromium but more advantageously copper. The treatment with the agents providing metal can be carried out according to customary methods known per se.

The treatment with agents providing metal, for example copper, in substance may be of advantage if the complex metal compound still possesses a sufficient solubility, which as a rule is the case with these dyestuffs. It can take place in alkaline, neutral or acid medium, with or without the addition of substances which promote complex formation or increase solubility. Also when the solubility is sufficient, but especially if the dyestuffs do not contain sufficient solubilising groups, so that their complex metal compounds are of less suitability for dyeing, in many cases the treatment with agents providing metal, especially copper, can take place with advantage on the fiber or in a single bath partly in the dyebath and partly on the fiber as is described for example in U. S. Patent No. 2,148,659. In many cases however very valuable dyeings are obtained when the operation is conducted by the process according to which the dyeings produced with the metal-free dyestuffs are after treated with such aqueous solutions as contain basic formaldehyde condensation products from compounds which contain in the molecule at least once the atom grouping

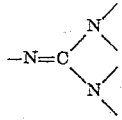

or, as for example cyanamide, can be easily converted into such compounds, and water-soluble, especially complex, copper compounds.

The dyeings obtainable with the new dyestuffs on cellulosic fibers are as a rule distinguished by purity of colour shade, good fastness to washing and above all by very good fastness to light.

The following examples illustrate the invention, the parts and percentages being by weight unless otherwise stated:

*Example 1*

The moist acid paste of the sulfonation product in 800 parts of water at 40° C. whereby it passes into solution which is then treated with 6 parts of anhydrous sodium carbonate whereupon with stirring at 40° C. phosgene is slowly passed in until the solution reacts acid to Congo.

The suspension of the urea from the aminoazo dyestuff is neutralized with sodium carbonate and if required again treated with phosgene until diazotizable aminoazo dyestuff can no longer be detected.

From the neutral solution the urea compound which corresponds to the formula

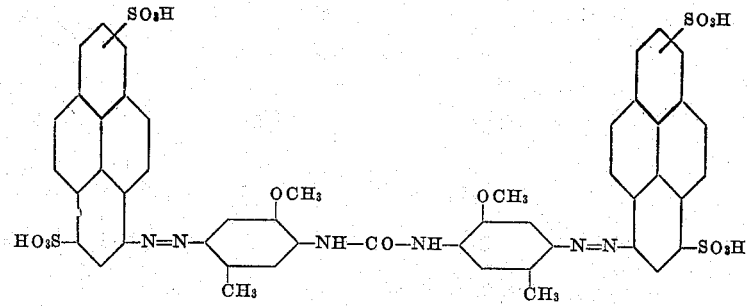

from 21.7 parts of 3-aminopyrene is dissolved in 300 parts of water at 80° C. and after cooling to 30° C. treated with ice until the temperature falls to 1-3° C. A solution of 7 parts of sodium nitrite in 35 parts of water is now added in portions and a diazonium compound obtained which may in part separate. To this is added the solution cooled to 5° C. of 13.7 parts of 1-amino-2-methoxy-5-methylbenzene dissolved in 200 parts of water and 15 parts of 30 per cent. hydrochloric acid. After some time the mineral acid is neutralized by addition of sodium acetate, sodium formate or sodium carbonate until the reaction remains only weakly acid or becomes neutral. After a few hours the formation of the aminomonoazo dyestuff is complete. The dyestuff solution is heated to 60° C. and by addition of sodium chloride (about 10 per cent. on the volume of the coupling mixture) the dyestuff is caused to separate completely. It corresponds to the formula

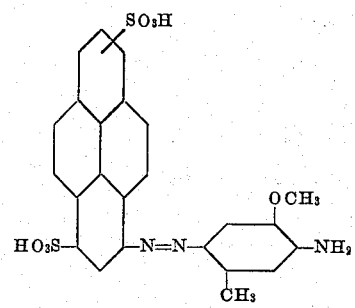

The paste of the aminoazo dyestuff is heated is separated with 10-15 volumes per cent. of sodium chloride, then filtered and dried. A brown powder is obtained which dissolves in water and dilute alkalis with a red and in concentrated sulfuric acid with a blue colour.

Cellulose fibers are dyed from a bath containing sodium sulfate in bright red shades which are of excellent fastness to light.

By replacing in the above example the 13.7 parts of 1-amino-2-methoxy-5-methylbenzene by the equivalent number of parts of 1-amino-2-ethoxy-5-methylbenzene a dyestuff is obtained with practically the same properties.

Further valuable dyestuffs are obtained when two molecules of the aminomonoazo dyestuffs obtainable from the above described diazotized 3-aminopyrene disulfonic acid and the primary amines of the benzene series set forth below, are linked by means of phosgene to form the symmetrical urea derivatives:

| No. | Amines coupled with the diazotized 3-aminopyrene sulfonic acid | Colour shade of the urea derivative on cotton |
| --- | --- | --- |
| 1 | 1-amino-2-ethoxy-5-methoxybenzene | bordeaux. |
| 2 | 1-amino-2-methoxy-5-ethoxybenzene | Do. |
| 3 | 1-amino-2-n-propyloxy-5-ethoxybenzene | Do. |
| 4 | 1-amino-2-n-butyloxy-5-methoxybenzene | Do. |
| 5 | 1-amino-3-methylbenzene | bright orange. |
| 6 | 1-amino-2-methoxy-5-isopropylbenzene | salmon red. |
| 7 | 1-amino-2-β-hydroxyethoxy-5-methylbenzene | pure red. |
| 8 | 1-amino-2-methoxy-5-cyclohexyl benzene | brown red. |
| 9 | 1-amino-3-methoxybenzene | red orange. |

The urea derivatives obtainable according to the preceding table correspond to the following formulae (1)

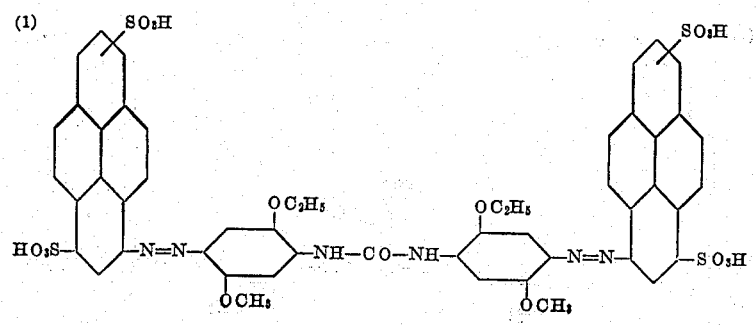

(2) 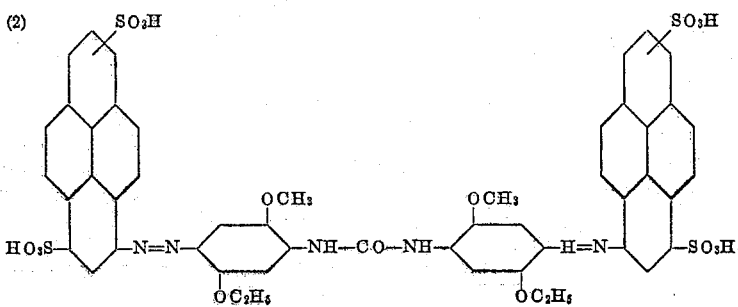
(3) 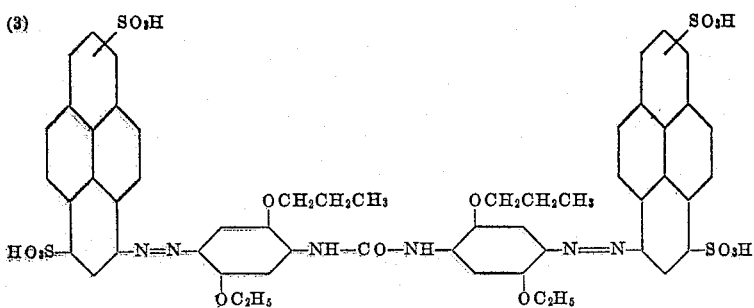
(4) 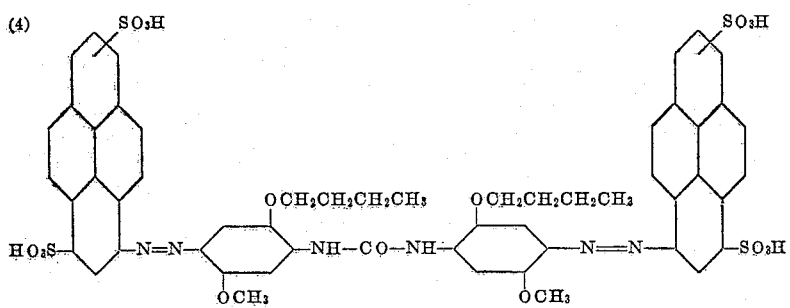
(5) 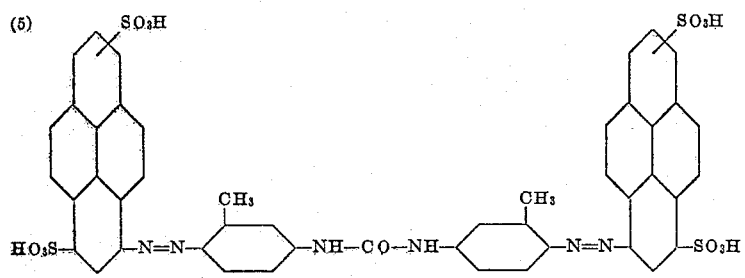
(6) 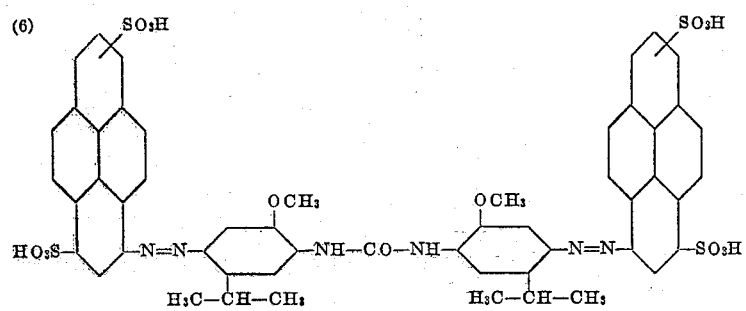
(7) 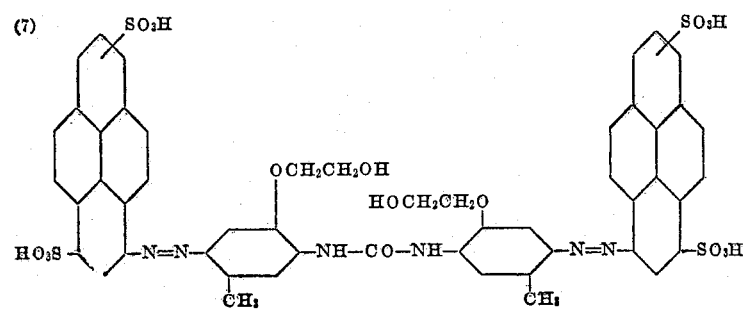

(8) 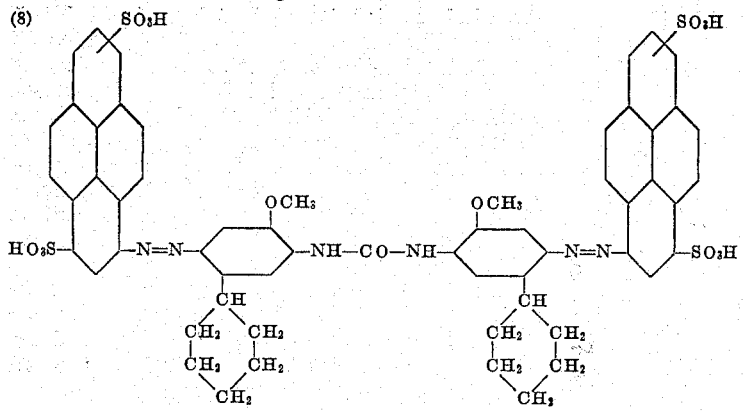

(9) 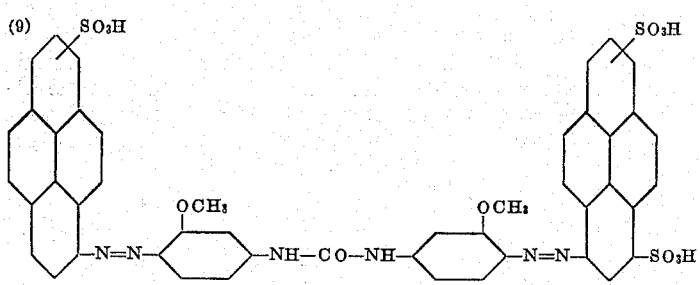

The 3-aminopyrene disulfonic acid employed as starting material in this example may be produced as follows: 21.7 parts of 3-aminopyrene are introduced into 220 parts of 100 per cent. sulfuric acid (monohydrate), whereby the temperature rises to about 40° C. The originally mobile solution after a few hours becomes viscous with the separation of crystals. The reaction mixture can now be introduced into ice and water whereby a precipitate is produced which contains practically the total quantity of the sulfonation product produced. This precipitate is filtered off and suitably is further used directly in the form of the acid paste (see above).

If desired this acid paste can also be dissolved in water, the solution neutralized with sodium hydroxide, sodium carbonate or ammonia and by addition of sodium chloride the product separated as the sodium or ammonium salt and filtered and dried. The alkali salts thus obtainable are very easily soluble in water and the solutions exhibit a characteristic strong green fluorescence.

Practically the same product is obtained when the sulfonation is carried out at 80–100° C.; in this case it is complete after only one to two hours.

*Example 2*

The aminoazo dyestuff which is obtained by weak acid coupling according to Example 1 from the diazotized sulfonation product from 21.7 parts of 3-aminopyrene and 13.7 parts of 1-amino-2-methoxy-5-methylbenzene, is dissolved in 800 parts of water and the solution neutralized and cooled to 0° C. To this solution are added 9.2 parts of cyanuric chloride dissolved in 30 parts of acetone. The whole is stirred for some time at 0–2° C., the mineral acid reaction being neutralized by means of a solution of 10 parts of sodium acetate in 50 parts of water. After ½ to 1½ hours 12 parts of sodium carbonate are added and the whole heated to 35–42° C. and stirred for a further 1–2 hours. Thereupon 12 parts of 33 per cent. ammonia are introduced and the temperature maintained for one hour at 80° C. Then 100 parts of sodium chloride are added whereupon the dyestuff which corresponds to the formula

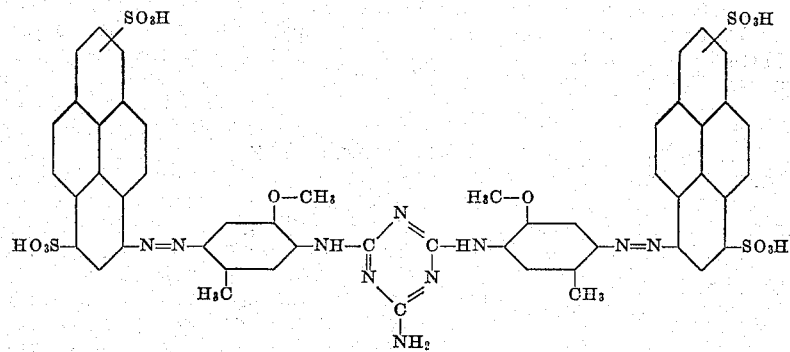

precipitates. It is filtered off and dried. It forms a brown orange powder which dissolves in water and dilute alkalies with an orange and in concentrated sulfuric acid with a blue colour. The dyestuff dyes cellulosic fibers from a bath containing sodium sulfate in bright red orange shades which are very fast to light.

A dyestuff which dyes cotton in orange shades is obtained when in the above example the 1-amino-2-methoxy-5-methylbenzene is replaced by the equivalent quantity of 1-amino-2:5-dimethylbenzene.

*Example 3*

The aminoazo dyestuff which is obtained when the diazotized sulfonation product from 21.7 parts of 3-aminopyrene (see Example 1) and 12.2 parts of 1-amino-2:5-dimethylbenzene are coupled in the presence of acid-binding agents in a weak acid to neutral solution, is dissolved in 800 parts of water at 50° C., 5.5 parts of anhydrous sodium carbonate are added and in the course of several hours with stirring phosgene is passed in until the reaction is acid to Congo. Thereupon the condensation product is neutralized and the passage of phosgene continued until no diazotizable aminoazo dyestuff can be detected. Then 80–100 parts of sodium chloride are added to the neutral solution of the condensation product whereupon the dyestuff which corresponds to the formula

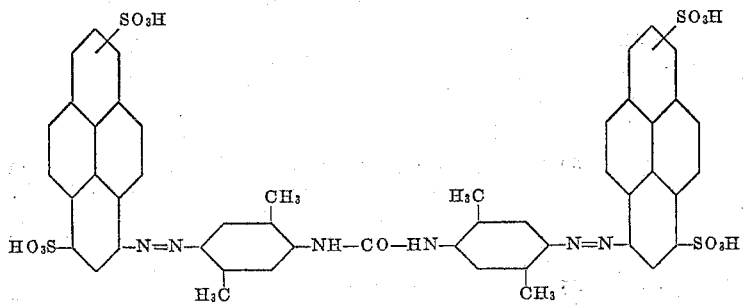

precipitates. It is filtered and dried and a brownish powder obtained which dissolves in water and dilute alkalies with an orange and in concentrated sulfuric acid with a blue colour. Cellulosic fibers are dyed from a bath containing sodium sulfate in red-orange shades of very good fastness to light.

If instead of the amino monoazo dyestuff specified at the commencement of this example the dyestuff obtainable in the same manner from the same diazo compound by coupling with 15.3 parts of 1-amino-2:5-dimethoxybenzene, is treated with phosgene in the manner described, a product is obtained which dissolves in water and dilute alkalies with a red and in concentrated sulfuric acid with a green-blue colour and dyes cellulosic fibers in bordeaux colored shades of good fastness to light.

*Example 4*

The aminoazo dyestuff which is obtained by the method of Example 1 when the diazotized sulfonation product from 21.7 parts of 3-aminopyrene is coupled in weak acid to neutral solution with 13.7 parts of 1-amino-2-methoxy-5-methylbenzene, is dissolved in 500 parts of water at 40–45° C. To the solution is added the solution in 500 parts of water of the aminoazo dyestuff which is obtained when the diazotized toluene sulfonic acid ester from 32 parts of 1-amino-8-hydroxynaphthalene-3:6-disulfonic acid is coupled in weak acid to neutral solution with 13.7 parts of 1-amino-2-methoxy-5-methylbenzene. The mixture of these two aminoazo dyestuffs is treated in the presence of acid-binding agents, such as sodium acetate or sodium bicarbonate at 40–45° C. with phosgene until a test portion can no longer be diazotized. Thereupon 20 parts of a 40 per cent. sodium hydroxide solution are added and the whole heated for ½ to 1 hour to 80–95° C. whereby the toluene sulfonic acid residue is split off. Neutralisation is effected with acetic acid and the dyestuff precipitated by addition of 100 parts of sodium chloride, filtered and dried. A dark powder is obtained which dissolves in water and dilute alkalies with a red and in concentrated sulfuric acid with a blue colour. Cellulosic fibers are dyed from a bath containing sodium sulfate in bright red shades of very good fastness to light.

Instead of the sulfonation product from 3-aminopyrene an equivalent quantity of the sulfonation product from 3-aminopyrene-4-sulfonic acid can be employed. A dyestuff is obtained with the specified dyeing properties.

If the aminomonoazo dyestuff according to Example 1 paragraph 1, is treated in the manner set forth in the first paragraph of the present example together with 25.7 parts of 4-amino-4'-hydroxy-1:1'-azobenzene-3'-carboxylic acid, with phosgene, a product is obtained which dissolves in water and dilute alkalies with a red-orange and in concentrated sulfuric acid with a blue colour and dyes cellulosic fibers in red-orange shades. By after-treatment of the dyeings with agents providing copper the fastness to washing of the dyeings is considerably improved; in this operation the colour shade remains practically unchanged.

*Example 5*

In 600 parts of water is dissolved the aminoazo dyestuff which is obtained when the diazotized sulfonation product from 21.7 parts of 3-aminopyrene is coupled in weak acid to neutral solution with 13.7 parts of 1-amino-2-methoxy-5-methylbenzene (see Example 1). The solution is neutralized, cooled with ice to 0–2° C. and treated with the solution of 18.5 parts of cyanuric chloride in 35 parts of acetone. The whole is stirred for ½–1 hour with addition of 10–20 parts of sodium acetate which neutralizes the free mineral acid produced in the condensation. After about one hour there is added a solution in 500 parts of water of the aminoazo dyestuff which is obtained when the diazotized toluene sulfonic acid ester from 32 parts of 1-amino-8-hydroxynaphthalene-3:6-disulfonic acid is coupled with 13.7 parts of 1-amino-2-methoxy-5-methylbenzene in the presence of acid-binding agents.

The solution mixture is rendered alkaline with 12 parts of sodium carbonate and stirred for 2 hours at 40–42° C. Thereupon 15 parts of 30 per cent. ammonia are added and the whole heated for one hour to 80–90° C. Finally by addition of 90 parts of 40 per cent. sodium hydroxide solution at 80–90° C. the toluene sulfonic acid residue is hydrolyzed from the condensation product.

The solution of the ternary condensation product is neutralized and 150 parts of sodium chloride are added whereby the dyestuff which corresponds to the formula

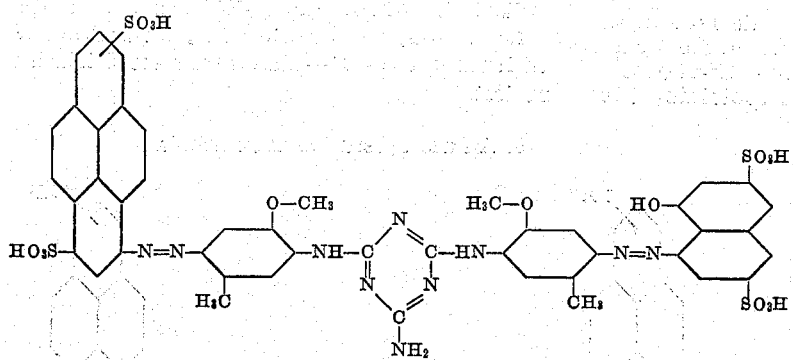

precipitates. It is filtered off and dried and an orange-powder obtained which dissolves in water and dilute alkalies with an orange and in concentrated sulfuric acid with a blue colour. Cellulosic fibers are dyed from a bath containing sodium sulfate in red-orange shades which are very fast to light.

By employing in this example instead of the dyestuff from the toluene sulfonic acid ester of 1 - amino-8-hydroxynaphthalene-3:6-disulfonic acid and 1-amino-2-methoxy-5-methylbenzene, 25.7 parts of 4-amino-4'-hydroxy-1:1'-azobenzene-3'-carboxylic acid and proceeding as above set forth but omitting the treatment with sodium hydroxide, a dyestuff is obtained which dissolves in water and dilute alkalies with a yellow-orange and in concentrated sulfuric acid with a blue colour and dyes cellulosic fibers in yellow-orange shades. By after-treatment of the dyeings with agents providing copper the fastness to washing of the dyeings is improved; in this operation the colour shade remains practically unchanged.

Example 6

The aminoazo dyestuff which is obtained as set forth in Example 1 from the diazotized sulfonation product from 21.7 parts of 3-aminopyrene and 13.7 parts of 1-amino-2-methoxy-5-methylbenzene by weak acid coupling, is dissolved in 800 parts of water and rendered neutral with sodium carbonate and cooled to 10° C. To this solution are added 10 parts of dichloroquinazoline dissolved in 40 parts of acetone. Stirring is carried out for some time and heating within two hours to 40° C. and within a further two hours to 95° C. which temperature is maintained for a further two hours. In this operation a solution of 6 parts of sodium carbonate in 50 parts of water is added in portions so that the solution of the dyestuff always reacts weakly alkaline. At the end of the condensation the condensation product is caused to separate by means of 100 parts of sodium chloride, filtered and dried. A brown powder is obtained which dissolves in water with an orange colour and dyes natural and regenerated cellulosic fibers in red-orange shades of good fastness to light.

Example 7

100 parts of cotton are entered at 50° C. into a dyebath which contains, in 3000 parts of water, 0.8 part of the dyestuff obtained according to the first paragraph of Example 1, the temperature is increased within half-an-hour to 90° C. and 30 parts of crystalline sodium sulfate added. Dyeing is then carried out for one hour at 90–95° C. and a pure red dyeing is obtained which is distinguished by very good fastness to light.

If 100 parts of cotton are dyed by the method just described with 1.5 parts of the dyestuff obtainable according to the last paragraph of Example 4, a red-orange dyeing is obtained. This dyeing is considerably improved as regards fastness to washing when it is after-treated for half-an-hour at 50° C. in a bath which contains in 4000 parts of water 3 parts of crystalline copper sulfate and 1 part of acetic acid. In this operation the colour shade remains practically unchanged.

What I claim is:

1. An azo dyestuff of the formula

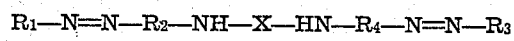

in which $R_1$ stands for an aromatic radical, $R_2$ stands for a benzene nucleus in which the —NH—group is in para-position to the —N=N—group, $R_3$ stands for a pyrene radical containing at least one sulfonic acid group and attached in 3-position to the —N=N—group, $R_4$ stands for a benzene radical to which the —NH—group and the —N=N—group are attached in para-position to each other, and —X— stands for a member of the group consisting of the —CO—group, the quinazoline radical bound to the —NH—groups in its 2- and 4-positions and a 1:3:5-triazine radical.

2. An azo dyestuff of the formula

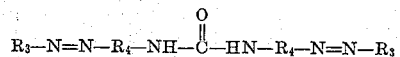

in which $R_3$ stands for a pyrene radical attached to the azo group in its 3-position and containing two sulfonic acid groups and $R_4$ stands for a benzene radical to which the —NH—group and the —N=N—group are attached in para-position to each other.

3. An azo dyestuff of the formula

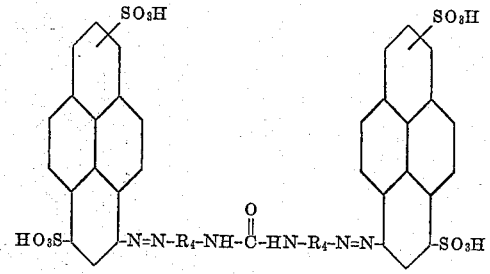

in which $R_4$ stands for a benzene radical to which the —NH—group and the —N=N—group are attached in para-position to each other.

4. An azo dyestuff of the formula

R₁—N=N—R₂—NH—X—HN—R₄—N=N—R₃ in which R₁ stands for an aromatic radical, R₂ stands for a benzene nucleus in which the —NH-group is in para-position to the —N=N-group, R₃ stands for a pyrene radical containing two sulfonic acid groups and attached in 3-position to the —N=N-group, R₄ stands for a benzene radical to which the —NH-group and the —N=N-group are attached in para-position to each other, and —X— stands for a 1:3:5-triazine radical.

5. An azo dyestuff of the formula

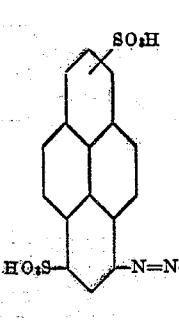 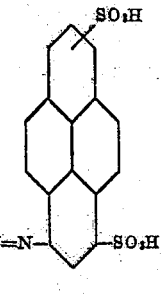

6. An azo dyestuff of the formula

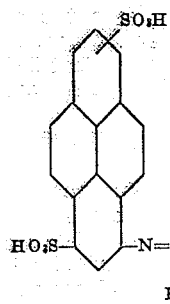 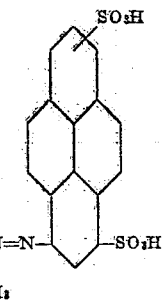

7. An azo dyestuff of the formula

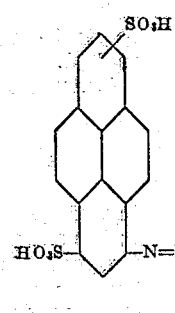 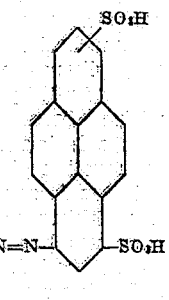

8. An azo dyestuff of the formula

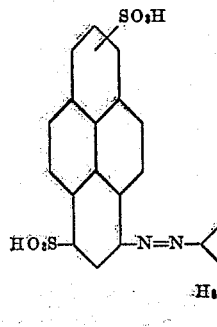 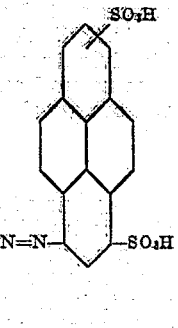

9. An azo dyestuff of the formula
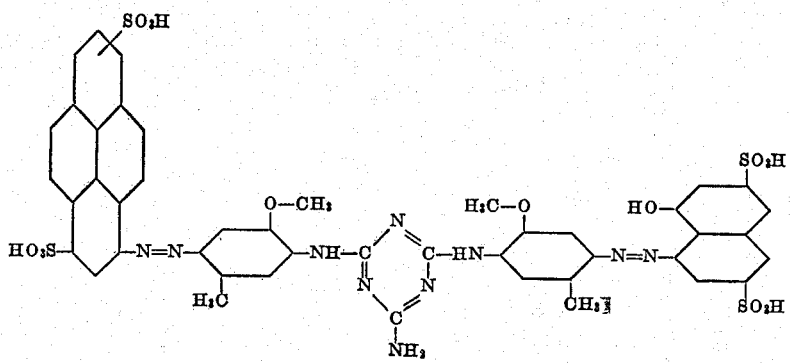
WALTER ANDERAU.
REFERENCES CITED
The following references are of record in the file of this patent:
UNITED STATES PATENTS
| Number | Name | Date |
|---|---|---|
| 1,982,977 | Bergdolt et al. | Dec. 4, 1934 |
| 2,364,355 | Frame et al. | Dec. 5, 1944 |